United States Patent Office 2,729,613
Patented Jan. 3, 1956

2,729,613

SOLID POLYMERS OF PERHALOGENATED POLYOLEFINS

William T. Miller, Ithaca, N. Y.

No Drawing. Application February 19, 1951,
Serial No. 211,790

24 Claims. (Cl. 260—33.8)

This application is a continuation-in-part of my copending applications Serial No. 601,387, filed June 25, 1945, now abandoned; Serial No. 10,912, filed February 25, 1948, now U. S. Patent No. 2,567,956; Serial No. 68,070, filed December 29, 1948; and Serial No. 69,237, filed January 4, 1949, both last now abandoned.

This invention relates to fluorocarbons and their derivatives and more particularly to polymers of polyunsaturated fluoroolefins such as conjugated and non-conjugated diolefins; and to a thermal method useful for producing the polymers as well as compounds containing four carbon atom membered rings.

In this application, the prefix "poly" modifies the term connected thereto and generally refers to the number of fluorine atoms or double bonds in the molecule and not to a multiple of a monomer unless the term "polymer" or derivative term is used.

The term "fluorocarbon" designates a carbon compound in which all of the substituents are fluorine unless otherwise indicated by a modifier. Thus, derivatives may be obtained corresponding to the replacement of fluorine by another group, analogous to hydrocarbon derivatives formed by the replacement of hydrogen in a hydrocarbon. Such a compound may be saturated or unsaturated.

The term "perhalogenated" with reference to compounds is used in a broad sense. The prefix "per" is used to indicate that all the hydrogen atoms of the corresponding hydrocarbon or hydrocarbon derivative are of the type indicated by the term following "per," unless otherwise indicated. That is, a perhalogenated compound is a compound in which all the hydrogen atoms are replaced by halogen.

In recent years there has been considerable interest in carbon compounds containing fluorine, particularly in those which contain a relatively large percentage of fluorine and few reactive bonds such as the saturated fluorocarbons, because of their high degree of inertness to may reactive sbstances; and in developing practical and commercially useful methods of preparing them. However, up to the time of this invention, only a small number of these compounds was known. I have found that the derivatives of the fluorocarbons, in which a minor proportion of the fluorine atoms has been replaced by another halogen or a stable radical and particularly by chlorine, for many purposes possess stability comparable to that of the fluorocarbons and offer attractive economies in view of the frequently lower cost of the substituted group such as chlorine, as compared with fluorine. The polymers made from polyolefinic fluorocarbons and fluorochlorocarbons constitute a preferred class of products of my invention. These polymers as produced are generally unsaturated but may be subsequently saturated with fluorine or chlorine to give more stable materials.

One object of this invention is to advance the chemistry of the fluorine containing compounds, particularly the perhalogenated compounds of relatively high fluorine content.

Another object of this invention is to produce substantially hydrogen-free fluorocarbons and their halogen derivatives.

Another object of the invention is to provide novel compounds including polymers of polyunsaturated perhaloolefines containing fluorine especially the conjugated diolefins, and a method for producing these compounds.

Another object of the invention is to provide polymers of such olefins, ranging in molecular weight from the dimers to multiples of the highest molecular weight and in physical characteristics from liquids of low viscosity and relatively high volatility which can be readily distilled through oils of medium to high viscosity, solids of waxy consistency and very low volatility (having a vapor pressure less than 0.001 mm. Hg at 25° C.) and up to plastic materials of excellent mechanical strength and fabricating properties.

Another object of the invention is to provide a class of fluoropolymers, individual members of which depending on their molecular weight and chemical structure, are useful as coolants, solvents, plasticizers, lubricants and plastics with novel properties, the members consisting substantially of carbon and fluorine or of carbon, fluorine and chlorine being particularly useful in applications where reactive substances are present.

Another object of the invention is to provide unsaturated fluoro perhalocarbons of low and of intermediate molecular weight and a practical synthesis for them.

Another object of the invention is to devise a convenient and effective synthesis for the dimers and trimers of fluoro perhalogenated conjugated diolefins, the perfluorocarbons and perfluorochlorocarbons especially after further treatment to saturate the unsaturated bonds present with fluorine or chlorine, being useful as lubricants where reactive substances are present.

Another object of the invention is to provide an effective method of producing fluoro perhalocyclobutenes and cyclobutanes, particularly those consisting of carbon and fluorine or carbon, fluorine and chlorine.

Another object of the invention is to provide an effective method for producing aliphatic unsaturated fluoro perhalocarbons.

Another object of the invention is to produce saturated fluorocarbons and chlorofluorocarbons.

Another object of the invention is to provide fluorine containing compounds containing condensed rings of which at least one is a cyclobutane ring.

Another object of the invention is to provide fluorine containing compounds containing at least two rings, at least one of which is a cyclobutane ring.

Another object of the invention is to provide new solid polymers.

Another object of the invention is to provide new plastic materials.

Another object of the invention is to provide plastic materials whose characteristic chemical and thermal stability render them widely useful in the handling of corrosive materials.

Another object of the invention is to provide substantially completely fluorine-substituted plastics which are elastic at relatively high and at relatively low temperatures.

Another object of the invention is to provide thermoplastic materials which have a high degree of thermal stability.

Other objects will appear hereinafter.

The products of the present invention include polymers of poly-unsaturated fluoroolefins, which olefins have at least three base carbon atoms, at least two double bonds between base carbon atoms and at least one and preferably several fluorine atoms attached to a base carbon atom, the remaining substituents being selected from the group of the halogens and perhalogenated organic radicals not more than one of which contains more than three carbon atoms. As one sub-class, the products of this invention are polymers of fluorine substituted conjugated diolefins of the general formula

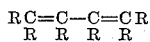

in which at least one of the R substituents is fluorine and the remaining R substituents are selected from the group of the halogens and perhalogenated organic radicals not more than one of which contains more than three carbon atoms. The R substituents may be the same or different. The preferred products of the present invention are polymers made from the olefins that consist of carbon and halogen and especially carbon and fluorine or carbon, fluorine and chlorine, because of their high degree of chemical stability. These monomers may, however, be substituted for example by a perhalo organic radical or functional group such as an ether group as —$OCF_3$, —$OC_2F_5$, —$OC_3F_7$, or —$OCFCl_2$, or a —CN or —$NO_2$ group; they are capable of undergoing polymerization without these groups being attacked and the products will be moderately stable. It is also preferred that the polymers be made from diolefins such as perfluorohexadiene-1,5 and especially conjugated diolefins of which hexafluorobutadiene-1,3 is the most preferred. However, the properties of the products may be varied in accordance with the use for which they are intended, by employing a monomer similar to hexafluorobutadiene-1,3 but different in that one or some of the fluorine atoms is replaced by a chlorine atom or by a perfluoroalkyl group such as —$CF_3$, —$C_2F_5$ or —$C_3F_7$, or a perchlorofluoroalkyl group such as —$CClF_2$, —$C_2Cl_2F_3$, —$C_3Cl_3F_4$, etc.

The polymers of the present invention range in molecular weight from the low molecular weight polymers such as the dimers and trimers, through the polymers of intermediate molecular weight including very viscous oils to waxy solids of low mechanical strength, and up to polymers of very high molecular weight which are useful as plastics. In the formation fo polymers, ring structures are formed which in general are four carbon atom membered rings although it is believed that rings with a higher number of carbon atoms are formed to a lesser extent and that the latter are unsaturated rather than aromatic. As regards molecular weight, the preferred polymers of this invention are the oils of viscosities corresponding to lubricants, and the solid polymers in the plastics range of molecular weight which are capable of being fabricated into durable articles and used as materials of construction. The term "plastic" is used herein to denote polymers which have considerable mechanical strength with a tensile strength in excess of 500 pounds per square inch and which may be formed hot.

According to the method of the present invention, useful compounds are made by heating at a temperature in the range of about 90° C. to about 700° C., a compound having at least three base carbon atoms, at least two double bonds between base carbon atoms, and at least one and preferably several fluorine atoms attached to a base carbon atom, and in which the remaining substituents are selected from the group of the halogens and perhalogenated organic radicals not more than one of which contains more than three carbon atoms. It is desirable that the starting material be a diolefin, especially of the conjugated type. Preferably the monomer consists of carbon and halogen and especially of carbon and fluorine or carbon, fluorine and chlorine. The products of the reaction belong to the group of dimers, trimers, polymers of greater molecular weight such as normally liquid and solid polymers, and the fluorine-substituted unsaturated and saturated compounds such as the cyclobutenes and cyclobutanes. The dimers and trimers may contain four carbon atom membered rings, e. g., cyclobutane rings.

The process of this invention may be carried out using a continuous flow system or a batch system. In the continuous flow system, the starting compound is passed through a reaction zone at an elevated temperature with a contact time of not more than a few minutes and preferably of 1 to 100 seconds. With this technique it is advantageous to employ temperatures in the range of above about 300° C. to about 700° C. and preferably about 400° C. to about 650° C. The reaction is suitably carried out at atmospheric pressure but if desired subatmospheric or super-atmospheric pressures may be used. Pressures of about 16,000 atmospheres may be used. When the monomer is a conjugated diolefin, an important product is the cyclobutene and the reaction equation is the following:

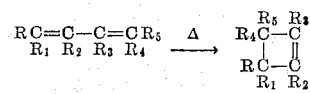

In the above formulas, at least one of the R substituents is fluorine and the remaining R substituents are selected from the group of the halogens and perhalogenated organic radicals not more than one of which contains more than three carbon atoms. It will be noted that an intramolecular cyclization takes place, the end carbon atoms becoming joined and the unsaturations at the end carbon atoms being supplanted by an unsaturation between the middle carbon atoms and the R substituents of each carbon atom remaining the same. One useful sub-class of products of the reaction consists of fluorocyclobutenes in which all of the R substituents are halogen selected from the group of fluorine and chlorine; and another useful sub-class of higher molecular weight consists of fluorocyclobutenes consisting of carbon and halogen in which the halogen is selected from the group of fluorine and chlorine and which are substituted by at least one perhaloalkyl radical of up to three carbon atoms. When the monomer is a non-conjugated diolefin, an important product is a cyclobutane compound and the reaction equation is the following:

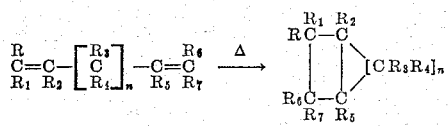

where $n$ is a whole number less than six and preferably from two to four, and R has the same meaning as above. It is noted that these products are also produced by intramolecular cyclization. These cyclized products thus have at least two condensed rings of which at least one is a cyclobutane ring.

Alternatively a batch system may be used in which the starting compound is heated in a bomb for a period of time of the order of several hours. With this technique it is desirable to employ temperatures in the range of about 90° C. to about 300° C.; with temperatures in the range of about 125° C. to about 200° C. being preferred. It is advantageous to permit the reaction to proceed at autogenous pressures of several atmospheres to obtain higher yields for a given container space, but if desired atmospheric or reduced pressures may be used. In this manner there may be obtained dimers, trimers, polymers of greater molecular weight, cyclobutenes and compounds containing cyclobutane rings. Distillation is a convenient method of separating the reaction products. Conditions may be regulated so as to control the principal product such as to obtain the dimer as the principal product or so as to yield a considerable quantity of trimer and higher molecular weight material. Maintaining the monomer in excess by choosing conditions which result in only partial reaction leads largely to the formation of the dimer. On the other hand, if the reaction is carried to completion, larger quantities of trimer are formed and in general its formation may be further promoted by maintaining a low concentration of monomer as by reacting an excess of dimer with monomer. This latter procedure also favors the formation of increased quantities of material of higher molecular weight than the trimer.

Temperatures substantially in excess of the minimum temperature for bringing about reaction generally favor the progressive polymerization of the dimer and trimer to higher molecular weight products.

The thermal reaction of this invention is characterized by the fact that it can be effected in the temperature range of 90° C. to 700° C. in the absence of catalysts and without the use of very high pressures. However, other substances may be present if desired. Anti-oxidants such as catechol may be used for the purpose of impeding the formation of long polymer chains, but are not essential. Catalysts and promoters may be used that are active in the temperature range set forth without departing from the scope of this invention.

The term "polymerization promoter" designates a substance whose function is the same as that of a catalyst in that it increases the rate of reaction, but differs from a catalyst in that it or fragments of it may be found in minor percentages in the polymer, particularly at the ends of the polymer chains; in the process it is consumed.

Generally speaking, when polymerization is carried out in the presence of a free radical-chain forming type promoter such as an organic peroxide, e. g., benzoyl peroxide, there is a tendency for longer chains to be formed with the production of a substantial yield of solid polymers. Promoters of this type include acetyl peroxide, chloroacetyl peroxide, difluoromonochloroacetyl peroxide, trifluoroacetyl peroxide, trichloroacetyl peroxide and oxygen. When an organic peroxide is used, the temperature selected should be such that it decomposes at a regulated rate. Ionic type catalysts such as aluminum chloride or stannic chloride or boron trifluoride or their complexes with organic compounds such as ethers may also be used to advantage in specific cases for the production of polymers by the method of this invention.

If desired, the reaction may be carried out in the presence of water with or without added emulsifiers. It may be carried out in the presence of dyes, pigments, plasticizers, fillers, natural resins, graphite or other modifiers.

Other methods useful in preparing solid polymers of hexafluorobutadiene-1,3 are described in detail in the copending applications referred to above and will be described herein but briefly.

When hexafluorobutadiene-1,3 is polymerized at pressures of the order of 1,000 atmospheres and less, it is desirable to use a small concentration of a promoter. In general, the amount used should not be in excess of about three percent by weight based on the monomer and preferably less than one percent. The temperature of this polymerization may be less than 70° C. The molecular weight of the polymer is increased at higher pressures and at lower concentrations of promoter. The products so obtained may range in properties from a heavy liquid to a relatively brittle solid and up to plastics. A polymer having the higher molecular weight characteristic of a plastic may be produced at these pressures by properly choosing the polymerization conditions. The mechanical characteristics of the plastic may be altered by use of a plasticizer such as a lower molecular weight liquid polymer or other compatible relatively low molecular weight material.

A rubbery thermoplastic polymer of very high molecular weight may be prepared by polymerizing hexafluorobutadiene-1,3 at extreme pressures in the range of 10,000 to 20,000 kgs./cm.$^2$. Under this high pressure a good yield is obtained generally in less than 24 hours at temperatures of less than 70° C.

In many cases the flexible polymer is a highly satisfactory elastic type material particularly useful under conditions of temperature and corrosiveness where rubber would fail. The rubbery polymer of hexafluorobutadiene-1,3 is orientable and extremely tough and elastic as well as thermally stable up to temperatures of at least 200° C. In addition, it has a higher corrosion resistance than rubber since it is substantially completely substituted with fluorine and therefore contains substantially no carbon-hydrogen bonds. The corrosion resistance is, however, somewhat less than that of a saturated fluorocarbon such as tetrafluoroethylene polymer since the hexafluorobutadiene polymer retains double bonds in its molecules. However, the corrosion resistance of the latter may be made substantially equal to that of polytetrafluoroethylene by treating the polymer with a fluorinating agent. Treatment of the rubbery plastic polymer with elementary fluorine acts in a manner similar to the vulcanization of rubber and hardens the material. In addition, the softening temperature of the polymer is in general increased by the fluorination. Alternatively, it may be treated with chlorine or mixtures of chlorine and fluorine or chlorine trifluoride to increase its corrosion resistance. In this instance the polymer retains its flexibility.

In the examples in which preparations of polymer were carried out at pressures in excess of 10,000 kgs./cm.$^2$, these were accomplished in equipment described in "Physics of High Pressure" by P. W. Bridgman, published by the MacMillan Company in New York in 1931. The steel pressure cylinder employed had a useful volume of approximately 8 to 15 ccs. and chloroprene gaskets were used to seal the piston. When a solid peroxide was included in the polymerization mixture, the pressure cylinder was rotated in a lathe to ensure complete mixing before application of high pressure.

EXAMPLE 1

Hexafluorobutadiene-1,3 was passed through a hot tube. The tube was surrounded by an oven and was formed with a central opening for a thermocouple. It was connected at one end to a source of olefin supply and at the other end to a receiver maintained at room temperature connected in turn to a receiver cooled by Dry Ice. About 90 gs. of hexafluorobutadiene-1,3 was passed through the tube at a temperature of 400° C. with a heat contact time of the order of seconds. At 400° C. reaction was rapid. The crude products were distilled and 45.8 gs. of a distillate having a boiling range of 5° C. to 10° C. was obtained. This distillate was allowed to stand overnight in a container cooled by Dry Ice and a considerable amount formed a crystalline white solid. Hexafluorobutadiene-1,3 does not crystallize at Dry Ice temperature. About 3 gs. of liquid consisting mostly of hexafluorobutadiene-1,3 was poured off. The remaining crystalline solid was allowed to melt and then was distilled. About 22.7 gs. of a material consisting largely of hexafluorocyclobutene and having a boiling range of 4.5° C. to 5.5° C. was obtained.

A sample of this material weighing about 20 gs. was sealed in a tube with an equal volume of liquid chlorine and the tube was exposed to direct sunlight at 45° C. for about 12 hours. The tube was then opened, volatile matter was permitted to escape at room temperature and the residue was distilled. About 13 gs. of a material consisting essentially of $C_4F_6Cl_2$ (dichlorohexafluorocyclobutane) molecular weight, 231.6 (theoretical molecular weight of $C_4F_6Cl_2$, 232.9) was obtained. This material was tested with a solution of potassium permanganate in acetone which is a sensitive reagent for detecting olefins consisting of carbon, fluorine and chlorine, which are readily oxidized thereby, and was evidently saturated.

EXAMPLE 2

Hexafluorobutadiene-1,3 was passed through a Pyrex tube at 500° C. to 530° C. A solid white product consisting essentially of hexafluorocyclobutene was obtained in a dry-ice cooled trap.

EXAMPLE 3

1,4-dichloroperfluorobutadiene-1,3
(CFCl=CF—CF=CFCl)
was passed through a hot nickel tube at approximately 400° C. with a calculated contact time of 14 seconds to yield a condensate with reduced index of refraction (from $n_D^{24}$ 1.4047 for the butadiene to $n_D^{24}$ 1.3965 for product) from which a substantial fraction of material was separated boiling lower than the starting butadiene and consisting essentially of 3,4-dichloroperfluorocyclobutene

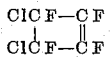

having a boiling range of 64 to 70° C. and boiling largely from 66.5 to 68° C., uncorrected.

In another similar preparation carried out at a maximum temperature of 400° C. with a calculated contact time of 60 seconds, a 28% yield of a fraction consisting essentially of cyclobutene boiling from 63.5 to 66° C. was obtained. A carefully measured boiling point indicated that the cyclobutene boils at 64.5° C. at 735 mm. Hg.

2,3-dichloroperfluorocyclobutene may be used in syntheses to produce other new and useful fluorocarbons. Thus it may be caused to react with chlorine in the presence of light to add chlorine and saturate the double bond:

$$\begin{matrix} CFCl-CF \\ | \phantom{x} \| \\ CFCl-CF \end{matrix} \xrightarrow{chlorine} \begin{matrix} CFCl-CFCl \\ | \phantom{xx} | \\ CFCl-CFCl \end{matrix}$$

The product $$\begin{matrix} CFCl-CFCl \\ | \phantom{xx} | \\ CFCl-CFCl \end{matrix}$$

1,2,3,4-tetrachloroperfluorocyclobutane is characterized by a melting point of 40° C.

EXAMPLE 4

2,3-dichloroperfluorobutadiene-1,3

$$(CF_2=CCl-CCl=CF_2)$$

was heated at about 176° C. for 89 hours. An appreciable yield of cyclized product was recovered, 1,2-dichloroperfluorobutene,

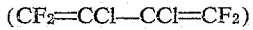

B. P. 66–68° C. Excess butadiene was separated from the cyclobutene by chlorination of the mixture followed by distillation to recover the butene in the form of its chlorine addition product 1,1,2,2-tetrachloroperfluorocyclobutane.

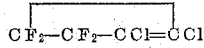

M. P. 83.2–83.5° C. 1,2-dichloroperfluorocyclobutene may be recovered from the tetrachloride by dechlorination with zinc in a solvent, suitably at the reflux temperature of the solvent at atmospheric pressure.

The following analogous reactions may also be carried out under similar conditions:

$$CF_2=CCl-CF=CF_2 \xrightarrow{\Delta} \begin{matrix} CF_2-CF \\ | \phantom{x} \| \\ CF_2-CCl \end{matrix}$$

$$CFCl=CF-CF=CF_2 \xrightarrow{\Delta} \begin{matrix} CF_2-CF \\ | \phantom{xx} \| \\ CFCl-CF \end{matrix}$$

The following reactions may also be carried out under similar conditions:

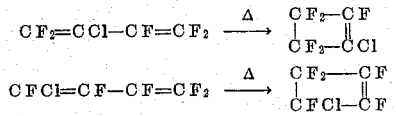

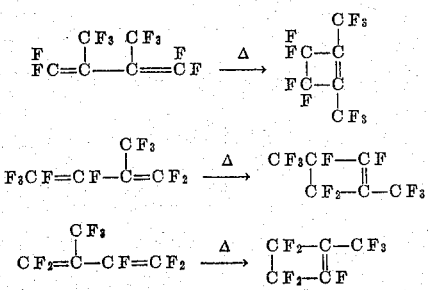

Products substituted by other radicals such as, for example, $-C_3F_7$, $-C_2F_5$, $-CF_2Cl$ and $-CFCl_2$ may similarly be prepared by the intramolecular cyclization of an appropriate compound. These reactions illustrate the heat treatment of conjugated diolefins consisting of carbon and halogen selected from the group of fluorine and chlorine, which are substituted by at least one perhaloalkyl radical of up to three carbon atoms and by at least one fluorine atom, to produce the corresponding fluorocyclobutenes.

Diene compounds useful for this method are conveniently prepared by dechlorination of the corresponding 1,2,3,4-tetrachlorobutane by means of zinc in the presence of a lower aliphatic alcohol, as shown by the following reactions:

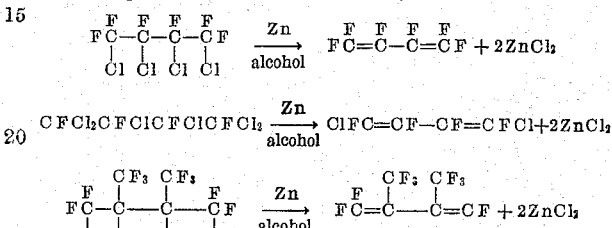

Further details of these reactions are given in my copending application Serial Number 173,689 (48), filed July 13, 1950.

The present invention provides a convenient and effective synthesis for a number of useful fluoro perhalocarbons containing a four carbon atom membered ring. This method is adapted to rapid, continuous operation and is a one-step process which has the advantage of avoiding the separation of purification of intermediate reaction products. The rearrangement can be effected by means of heat alone without the addition of catalysts or other aids to reaction so that the problem of distributing such substances in the starting material is avoided. This method has certain advantages over the process of preparing fluorocyclobutenes which involves the dimerization of a suitable fluoroethylene to produce a polyfluorocyclobutane derivative of a halogen other than fluorine, followed by removal of halogen to produce the cyclobutene. Thus, for example, trifluoromonochloroethylene, $CF_2=CFCl$, may be heated at a temperature in the range of 100° C. to 500° C. under super-atmospheric pressure to yield dichlorohexafluorocyclobutane,

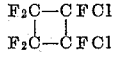

The latter compound is then dechlorinated with zinc in the presence of ethanol at the reflux temperature of ethanol to give hexafluorocyclobutene,

By means of the present method, however, certain compounds can be prepared which cannot be prepared by the two-step process. For example,

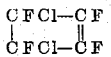

can be made by cyclization but not from $CFCl=CFCl$ by dimerization followed by dechlorination.

By means of this process fluoro perhalocyclobutenes are obtained, in good yield, which are unsaturated and are useful as monomers in polymerization reactions. They are also useful in other syntheses. For example, they may be caused to react with fluorine or chlorine to produce saturated compounds which are useful for various applications, such as for heat exchange liquids in connection with processes in which corrosive substances are used. They may be oxidized to dibasic acids which are useful for further synthesis through the acid functional groups.

EXAMPLE 5

Perfluorohexadiene - 1,5, $CF_2=CFCF_2CF_2CF=CF_2$, B. P. 60° C. was passed through a hot tube at approximately 450° C. with a contact time of from 30 to 90 seconds. A substantial conversion to lower boiling material occurred. This product, B. P. 42.5–43.0° C., M. P. 41° C., was separated by careful fractionation from unchanged starting material. Unchanged diene may also be removed by chlorination to yield its tetrachloride, $CF_2ClCFClCF_2CF_2CFClCF_2Cl$ which is readily separated by simple fractional distillation from the cyclized product

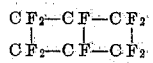

(perfluorobicyclohexane). The product was saturated to an acetone solution of potassium permanganate and to bromine in carbon tetrachloride solution in the presence of strong light. The molecular weight found was 260 and the calculated molecular weight for $C_6F_{10}$ is 262. Its structure was indicated as

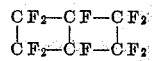

The above experiment is an example of an intramolecular reaction using a preferred sub-class of the non-conjugated dienes, which have the formula $$CFX=CX-(CR_2)_nCX=CFX$$

where $n$ is a whole number less than 6 and preferably 2 to 4, X is either fluorine or chlorine and R is chosen from fluorine, chlorine or a saturated grouping fully substituted thereby. In this case a saturated fluorocarbon or chlorofluorocarbon is obtained directly in a one-step process in contrast to the corresponding reaction of a conjugated butadiene-1,3 which yields a butene by intramolecular cyclization. The saturated fluorocarbons and chlorofluorocarbons produced by this process are directly useful as heat transfer media, stable solvents, and the like but in general are not as useful as chemical intermediates as the cyclobutenes obtained from the conjugated butadienes due to the greater reactivity of the latter.

Other examples are illustrated below:

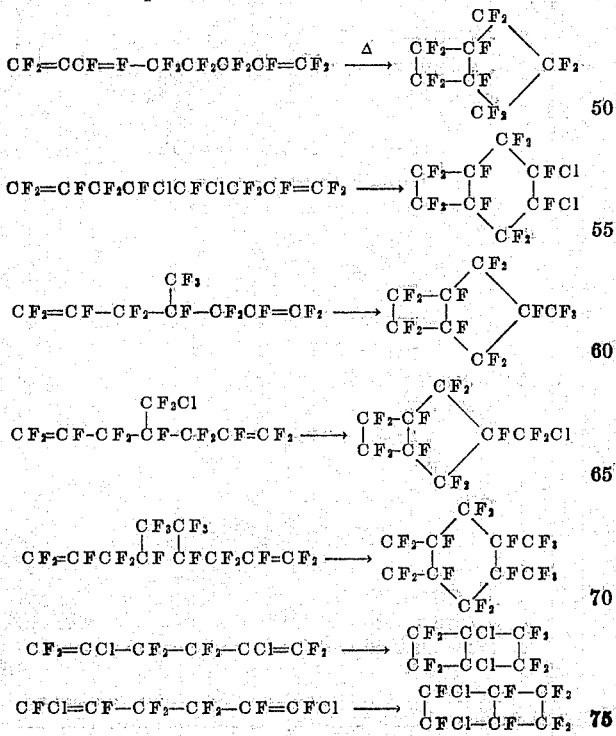

The preparation of perfluorohexadiene-1,5 is disclosed in my copending application Serial Number 173,689 (48), filed July 13, 1950.

EXAMPLE 6

Hexafluorobutadiene-1,3, obtained by the dechlorination of 1,2,3,4-tetrachloroperfluorobutane with zinc in the presence of absolute ethyl alcohol, was purified by mixing with $P_2O_5$ and distilling. Two steel bombs were each charged with a quantity of the diene compound under conditions to exclude oxygen and were then heated at 180° C. ±12° C. for 15 hours. The products were separated by distillation and several fractions were obtained including a low-boiling fraction which condensed, partially as a solid, in a Dry Ice trap and consisted largely of hexafluorocyclobutene; a fraction boiling from 96° to 100° C. containing a product $C_8F_{12}$; a fraction boiling from 62° to 68° C. at 10 mm. Hg containing a product $C_{12}F_{18}$; and a higher boiling residue. The Dry Ice trap material was reacted with chlorine in the presence of ultra violet light and the products were distilled to yield

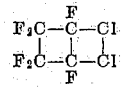

B. P. 60–61° C. (uncorrected), obtained by the addition of two atoms of chlorine to

and

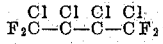

obtained by the addition of four atoms of chlorine to unreacted $CF_2=CF-CF=CF_2$. The results of the runs are summarized in Table I.

Table I

| Run No. | I | II |
|---|---|---|
| Weight starting $C_4F_6$ ___gs__ | 350 | 390 |
| Weight recovered material ___gs__ | 346 | 382 |
| Percent of starting material reacted | 97 | 97 |
| Perfluorocyclobutene; percent of reacted material | 13 | 13 |
| Perfluorobutadiene dimer, $C_8F_{12}$, B. P. 96–100°; percent of reacted material | 38 | 37 |
| Perfluorobutadiene trimer, $C_{12}F_{18}$, B. P. 62–68° at 10 mm. Hg; percent of reacted material | 29 | 32 |
| Residue B. P. above 75° at 10 mm. Hg; percent of reacted material | 4 | 4 |

The dimers and trimers are believed to exist in several isomeric forms. This is borne out by the fact that the raw fractions have an extended boiling range instead of a sharp boiling point and by the isolation of individual isomers from the products. For example, from Fraction II of this experiment there may be recovered 1,2-divinyl perfluorocyclobutane,

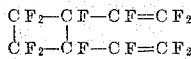

B. P. about 98° C. by a method of halogenation followed by dehalogenation.

When $C_8F_{12}$ was heated in a sealed glass tube at 195° to 200° C. for 65 hours, it was partially converted to a solid, saturated isomer, M. P. about 40° C., B. P. about 80° C., average molecular weight 324, in accordance with the following reaction:

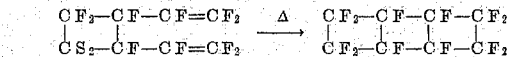

A dimer is also obtained which forms a saturated hexachloride, $C_8Cl_6F_{12}$ on chlorination, thus indicating the existence of a triene as one of the isomeric dimers.

EXAMPLE 7

An experiment was carried out under conditions similar to those in Example 6 except that the bombs were maintained at 160° C. for 5 hours. The results are summarized in Table II.

*Table II*

| Run No. | I | II |
|---|---|---|
| Weight starting $C_4F_6$ gs | 323 | 327 |
| Weight recovered material gs | 321 | 324 |
| Perfluorobutadiene recovered gs | 201.0 | 206.2 |
| Percent of starting material reacted | 37.8 | 36.9 |
| Perfluorocyclobutene formed gs | 6.6 | 6.7 |
| Perfluorocyclobutene; percent of reacted material | 5.4 | 5.6 |
| $C_8F_{12}$, perfluorobutadiene dimer, B. P. 96–100° C.; percent of reacted material | 85.8 | 85.0 |
| Perfluorobutadiene trimer, B. P. 165–180° C.; percent of reacted material | 3.8 | 3.2 |

$C_8F_{12}$ and $C_{12}F_{18}$ can be saturated with fluorine to give very stable products. The fluorination may be carried out, for example, by treating the unsaturated compound in the vapor phase with $CoF_3$ or $AgF_2$ or with $F_2$ in the presence of the silver coated copper catalyst described in U. S. Patent Number 2,510,864 of George H. Cady. The reaction of a double bond in a fluorocarbon compound takes place more readily than the replacement of a hydrogen atom, hence this is a preferred method of preparing saturated perfluorocarbons substantially free of hydrogen.

EXAMPLE 8

One-half gram of finely ground catechol was placed in a steel bomb. The bomb was thoroughly flushed with dry nitrogen and 217 grams of hexafluorobutadiene-1,3 which had been distilled through calcium chloride was added. The mixture was heated at about 130° C. for about 30 hours. The bomb was heated in an oil bath up to 75° C. and 32.5 gs. of low boiling material distilled and condensed in a Dry Ice trap as a milky liquid. The cloudiness indicated the presence of a crystalline product, hexafluorocyclobutene. 181.6 grams of liquid was poured out of the bomb and separated into fractions by distillation. Distillation yielded 103.8 gs. of a product consisting essentially of $C_8F_{12}$, B. P. 55–56° C. at 150 mm. Hg; 48.3 gs. of a product consisting essentially of $C_{12}F_{18}$, B. P. 65–66° C. at 10 mm. Hg; and a higher boiling residue containing higher polymers of 16 and 20 carbon atoms.

EXAMPLE 9

One-half gram of catechol, 15.6 gs. of hexafluorobutadiene-1,3 and 32.1 gs. of its dimer, $C_8F_{12}$, were placed in a tube under oxygen excluding conditions. The tube was maintained at 95° C. to 100° C. for 23 hours and then at 150° C. to 160° C. for 41 hours. The products were separated by distillation to yield 2.3 gs. of a low boiling fraction, $C_4F_6$; 30.6 gs. of a fraction boiling largely from 98° C. to 102° C. consisting essentially of $C_8F_{12}$; 7.4 gs. of a fraction consisting essentially of $C_{12}F_{18}$, and about 8 gs. of residue. On further distillation of the residue it yielded catechol and a fraction boiling at about 265° C. to 270° C. containing $C_{16}F_{24}$.

EXAMPLE 10

About 355 gs. of hexafluorobutadiene-1,3 was heated in a bomb at 94–96° C. for about 43 hours. A pressure of about 200 pounds per square inch developed in the bomb during heating. The reaction products were distilled. After distilling 281 gs. of material volatile at 60° C. which condensed in a Dry Ice trap, 72 gs. of products remained. About 55 gs. of the latter was separated by fractional distillation in a $CO_2$ atmosphere and yielded 36 gs. of a fraction boiling largely from 98.5–100° C. in addition to some lower and some higher boiling material. This fraction was refractionated to yield a portion boiling largely at 98.8° C., average molecular weight 325, and another portion boiling largely at 100.0° C., average molecular weight 321 (molecular weight $C_8F_{12}$, 324), thus indicating the presence of isomers.

EXAMPLE 11

11.7 grams of $C_{12}F_{18}$, prepared by the thermal treatment of hexafluorobutadiene-1,3 at 150° C. in an atmosphere of $CO_2$ and in the presence of catechol, was sealed in a Pyrex tube and heated at about 300° C. for 64 hours. 5.3 grams of polymer, mostly solid, was obtained which did not distill with a bath temperature of 320° C. at 1.5 mm. Hg.

EXAMPLE 12

1.7 grams of $C_8F_{12}$ was heated in a sealed glass tube at 195° C. to 205° C. for 65 hours. After drying the products at 105° C. for 4 hours, 0.5 g. of a solid, perfluoro higher polymer was obtained. It was substantially insoluble in ether, 95% alcohol, acetone, $C_4Cl_3F_2$ or $C_4Cl_4F_6$. On being heated in a metal bath, it was stable at temperatures below 250° C.

The starting material, hexafluorobutadiene-1,3 dimer, $C_8F_{12}$, contains the isomer $$\begin{array}{c} CF_2-CF-CF=CF_2 \\ | \\ CF_2-CF-CF=CF_2 \end{array}$$

Hence this example illustrates the polymerization of a polyolefinic non-conjugated fluoro perhalocarbon.

EXAMPLE 13

Perfluorohexadiene-1,5, $$CF_2=CFCF_2CF_2CF=CF_2,$$

B. P. 60° C., was placed in a steel pressure bomb in a nitrogen atmosphere. The bomb was heated to 200°±5° C. for 48 hours in a tubular electric oven. The following products were isolated: $C_6F_{10}$, recovered starting material, $CF_2=CFCF_2CF_2CF=CF_2$, B. P. 60° C.; $C_6F_{10}$, saturated isomer, $$\begin{array}{c} CF_2-CF-CF_2 \\ | \quad | \quad | \\ CF_2-CF-CF_2 \end{array}$$

B. P. ca. 43° C.; $C_{12}F_{20}$, dimer, B. P. 168–175° C.; $C_{18}F_{30}$, trimer, B. P. 128–138° C. at 10 mm. Hg; $(C_6F_{10})_n$, higher polymers, B. P. >140° C. at 10 mm. Hg. The structures are shown below:

dimer $$\begin{array}{c} CF_2-CF-CF_2-CF_2-CF=CF_2 \\ | \\ CF_2-CF-CF_2-CF_2-CF=CF_2 \end{array} \xrightarrow{\Delta} \begin{array}{c} CF_2-CF-CF_2-CF_2-CF-CF_2 \\ | \quad\quad\quad\quad\quad\quad\quad\quad\quad | \\ CF_2-CF-CF_2-CF_2-CF-CF_2 \end{array}$$

(unsaturated)        (saturated)

trimer $$\begin{array}{c} CF_2-CF-CF_2-CF_2-CF=CF_2 \\ | \\ CF_2-CF-CF_2-CF_2-CF=CF_2 \\ | \\ CF_2=CF-CF_2-CF_2-CF-CF_2 \end{array}$$

tetramer $$\begin{array}{c} CF_2-CF-CF_2-CF_2-CF=CF_2 \\ | \\ CF_2-CF-CF_2-CF_2-CF-CF_2 \\ | \\ CF_2-CF-CF_2-CF_2-CF-CF_2 \\ | \\ CF_2-CF-CF_2-CF_2-CF=CF_2 \end{array}$$

Other structures are also formed which involve transfer of fluorine such as $$CF_2=CF-CF_2-CF-CF=CF_2$$
$$CF_2=CFCF_2CF_2-CF-CF_3$$

but in general not as major products.

EXAMPLE 14

A 5 g. sample of 2,3-dichloroperfluorobutadiene-1,3, $CF_2=CCl-CCl=CF_2$, boiling at 67–70° C., was heated in a glass tube at 150° C. for 44 hours. The reaction products were distilled and 2 gs. of viscous, oily polymer boiling above 180° C. was recovered.

The starting material 2,3-dichlorotetrafluorobutadiene-1,3 is further characterized by its reaction with bromine to yield a dibromide under the following conditions. Bromine, 28.7 g. was added to 35 gs. of

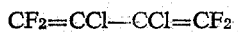

in a glass tube and the tube sealed after cooling in a Dry Ice bath. The above quantities represent equimolecular amounts. The tube was allowed to warm gradually in diffuse light. At about 0° C. a vigorous reaction occurred with heat evolution. This was controlled by periodic cooling and exclusion of light. Finally, after the vigorous reaction was over, the bomb was irradiated at room temperature with a 100 watt Mazda lamp with occasional shaking until the bromine was absorbed as evidenced by color change. The tube was cooled, opened and the contents distilled to yield: 61.0 gs., B. P. 100.0–104.5° C. at 100 mm. Hg and 1.8 g. residue. The former material was recrystallized from methyl alcohol with Dry Ice cooling and redistilled to yield a center cut of 26.6 gs., B. P. 103.6–103.7° C. at 100 mm. Hg; M. P. —6.6 to —6.2° C.; $n_D^{20}$, 1.4710; $d_4^{20}$, 2.1531. This compound was very resistant to further bromination. It was assigned the structure $CF_2BrCCl=CClCF_2Br$ on the basis of bromine content and failure to brominate further since the other possible isomer $CF_2=CCl-CClBr-CF_2Br$ would be expected to brominate further. At room temperature it did not react with 10% sodium iodide during one hour. However, reaction occurred on standing over night. Similar results were obtained with 1N NaCN in methyl alcohol.

EXAMPLE 15

In a nitrogen atmosphere, 135.2 gs. of 2,3-dichlorotetrafluorobutadiene-1,3 was placed in a steel bomb which was fitted with a steel valve. The valve was closed and the bomb heated in a vertical electric oven equipped with a thermoregulator, at about 170° C. for 44 hours. The temperature was determined by a Chromel Alumel thermocouple attached to the bomb. After cooling to 0° C. the reaction product was transferred to a 125 cc. distilling flask. Distillation at 739 mm. Hg through a 1.4 x 30 cm. column packed with ⅛" glass helices yielded: (1) 77.2 gs., B. P. 66.2–66.7° C. (boiling largely at 66.5° C.); and (2) 54.0 gs. still residue. Redistillation of (2) yielded (3) 10.7 gs., B. P. 67° C. at 740 mm. Hg to 50° C. at 200 mm.; (4) 40.7 gs., B. P. 144–151° C. at 200 mm.; and (5) 1.7 g. higher B. P. residue.

Fractions (1) and (3) consisted of a mixture of $CF_2=CCl-CCl=CF_2$ and

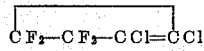

which compounds cannot be readily separated by distillation. This was shown by chlorination followed by separation of the dichloride of the cyclobutene from the tetrachloride of the butadiene. For example, by chlorination of a 20.1 g. sample of fraction (1) and separation of the products an approximate composition of 23% cyclobutene and 77% butadiene was established.

After separating a 19.4 g. sample of fraction (4) for chlorination the remainder was filtered at 0° C. and 5 gs. solid material separated. Recrystallization from methyl alcohol yielded 2 gs. white crystalline solid which sublined at about which sublimed at about 154° C. without melting, melted in a sealed tube at 251.8–252.0° C. and was saturated to potassium permanganate dissolved in acetone. Calculated for $C_8F_6Cl_4$: Cl, 36.4%; F, 39.0%; mol. wt., 390. Found: Cl, 36.4, 36.2%; F, 38.4, 38.5%; mol. wt., 388. On the basis of the above observations and the method of preparation this compound was assigned the following structure and is named tricyclotetrachlorooctafluorooctane:

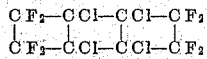

Distillation of the liquid filtrate obtained from fraction (4) above at 100 mm. Hg through a column with a packed section 1.4 x 30 cm. yielded: (6) 1.9 g., B. P. 102–114° C. at 100 mm. Hg (solid at room temperature); (7) 1.4 g., B. P. 114–131° C. at 100 mm. Hg (solid-liquid mixture at room temperature); (8) 11.8 g., B. P. 131–137° C. at 100 mm. Hg (liquid at room temperature); (9) 2.5 g. liquid residue. Fraction (8) was unsaturated to potassium permanganate in acetone and absorbed bromine in carbon tetrachloride solution with illumination by a 100 watt incandescent lamp. Its physical properties were: formed a glass at approximately —65° C.; $n_D^{20}$, 1.4373; $d_4^{20}$, 1.7889.

The unsaturated dimer of 2,3-dichlorotetrafluorobutadiene-1,3 was shown to consist of more than one isomer by chlorination. For example, the 19.4 g. sample of fraction (4) indicated above was sealed in a thick walled glass bomb with 20 g. of chlorine and irradiated for 9 days. The products were separated first by simple distillation at 50 and 20 mm. Hg and then by fractional distillation through a short packed column. The following materials were obtained.

Additional tricyclotetrachlorooctafluorooctane was separated as a lower boiling fraction to which chlorine did not add on.

A dichloro addition product of the dimer of 2,3-dichlorotetrafluorobutadiene-1,3, a hexachlorooctafluorooctene, $C_8Cl_6F_8$, B. P. 126–130° C. at 20 mm. Hg, formed a glass at approximately —50° C. and had these properties: $n_D^{20}$, 1.4536, calculated for $C_8Cl_6F_8$, Cl, 45.4%; found, Cl, 45.8, 45.9%. The product was unsaturated to potassium permanganate dissolved in acetone. It yielded a white precipitate with 2N $CH_3ONa$ solution in $CH_3OH$ and yielded a precipitate with 10% NaI. These observations indicated the structure

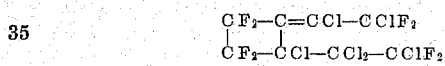

corresponding to the dimer structure

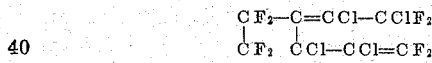

before chlorination.

An intermediate fraction corresponding to a tetrachloride of the dimer of 2,3-dichlorotetrafluorobutadiene-1,3, $C_8Cl_8F_8$, was separated, of B. P. approximately 132° C. at 3 mm. Hg. Its structure is believed to be

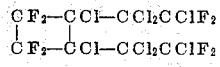

corresponding to an original dimer structure of

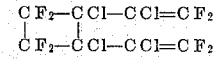

A hexachloride of the dimer of 2,3-dichlorotetrafluorobutadiene-1,3 was separated from the fraction of chlorination product of B. P. 134 to 156° C. at 1 mm. Hg (boiling largely at 148° C.) which melted above room temperature. Recrystallization from methyl alcohol yielded a white crystalline solid M. P. 84.2–84.4° C. which was saturated to potassium permanganate in acetone and had these properties: calculated for $C_8Cl_{10}F_8$, Cl, 58.8%; found, Cl, 58.9, 58.8%. The addition of 6 chlorine atoms to the dimer indicated a triene of open chain structure for the dimer fraction yielding this product. The following structure was assigned to this portion of the dimer product

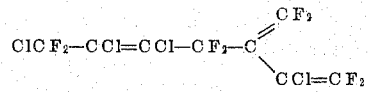

A small yield of trimer or higher polymers of 2,4-dichlorotetrafluorobutadiene was formed at 170° C.

The approximate composition of the reaction mixture obtained by heating 2,3-dichlorotetrafluorobutadiene-1,3 at 170° C. as estimated from the boiling points and weights of distillation fractions is summarized in Table III.

Table III

| | |
|---|---|
| Weight recovered $CF_2=CCl-CCl=CF_2$ _____gs__ | 67.6 |
| Percent of starting material reacted _____ | 50 |
| 1,2-dichlorotetrafluorocyclobutene-1; percent of reacted material _____ | 30 |
| 2,3-dichlorotetrafluorobutadiene-1,3 dimer; percent of reacted material: | |
| Saturated dimer _____ | 22 |
| Unsaturated dimer _____ | 42 |

EXAMPLE 16

0.13 gram benzoyl peroxide was added to 12.3 gs. of 2,3-dichlorotetrafluorobutadiene-1,3 in a small pressure bomb. The bomb was sealed and heated for 44 hours at about 85° C. (Under these conditions in the absence of added peroxide no appreciable thermal polymerization of the butadiene occurs.) After cooling the bomb it was opened and the contents distilled to yield: 10.9 gs. recovered butadiene fraction, B. P. 67–69° C. and 1.0 g. residue remaining after heating to 160° C. The residue was a viscous yellow oil polymer with an index of refraction of 1.520 at 20° C. as compared with an $n_D^{20}$ of 1.3838 for the monomeric butadiene.

EXAMPLE 17

1930 grams of hexafluorobutadiene-1,3 was placed in a pressure container and heated at 150° C. for 43 hours. After permitting 150 gs. of volatile material to distill out of the bomb, by heating up to 60° C. in a water bath, the remainder was fractionally distilled. 1026 grams of the dimer, $C_8F_{12}$, was obtained. The residue from this distillation was distilled under vacuum and yielded 190 gs. of the trimer, $C_{12}F_{18}$.

Hexafluorobutadiene-1,3 was heated under various conditions as set forth in the following table of examples. The products noted were obtained by distillation after removal of volatile material. In each example, a substantial amount of dimer was obtained.

| Example No. | Other Reagents Added | Wt. Reagent Added, gs. | Wt. $C_4F_6$, gs. | Temp., ° C. | Time, hrs. | Products |
|---|---|---|---|---|---|---|
| 18 | $SbCl_5$ | 5 | 54 | 125 | 44 | 10.8 gs. fraction B. P. 82–98° C. |
| 19 | $SnCl_4$ | 5 | 52 | 125 | 44 | 5.6 gs. fraction B. P. 94–94.5° C. and 14.8 gs. residue. |
| 20 | None | | 52 | 125 | 44 | 11.8 gs. fraction B. P. 97–98.5° C. and 5.7 gs. residue. |
| 21 | $H_2SO_4$ | 1.5 | 49 | 125 | 44 | 23.7 gs. fraction B. P. 97–98.5° C. and 3.9 gs. residue. |
| 22 | $AgNO_3$ | 2 | 47 | 125 | 44 | 16.2 gs. fraction B. P. 97–98.5° C. and 1.2 gs. residue. |
| 23 | $Na_2O_2$ | 1 | 51 | 125 | 44 | 12.4 gs. fraction B. P. 97–98° C. and a solid residue. |

The following examples illustrate the production of solid polymers of fluoro perhalogenated polyolefins, which in some instances are of moderate molecular weight and in other instances of high molecular weight with utility as resilient, rubbery plastics.

EXAMPLE 24

Approximately 228 gs. of hexafluorobutadiene-1,3 was placed in a pressure cylinder and 10 gs. of benzoyl peroxide was added. The cylinder was sealed and maintained at a temperature of 85° C. for 60 hours. A tacky, white, wax-like solid with little mechanical strength was obtained with a yield of 23%.

EXAMPLE 25

Approximately 99 gs. of hexafluorobutadiene-1,3 was polymerized for 7 days at 70° C. in the presence of 0.5 g. of benzoyl peroxide. From this reaction 5 gs. of a white, slightly gummy solid was obtained which had little mechanical strength. The product was ground under acetone with a mortar and pestle and thereafter was heated on a hot plate to remove the acetone. The solid remaining after this treatment was washed with acetone. There were separated a solid, white powder which was 60% of the original solid obtained and a tacky, gummy material which was 40% of the product of polymerization. The solid powder melted at 125° C.

EXAMPLE 26

One hundred gs. of hexafluorobutadiene-1,3 was polymerized at 85° C. for 63 hours in the presence of 10 gs. of benzoyl peroxide. The unreacted monomer was allowed to evaporate from the bomb and there remained 47.8 gs. of a white, tacky, wax-like material.

EXAMPLE 27

A $CHCl_3$-insoluble hexafluorobutadiene-1,3 polymer was prepared by heating the monomer with 4% by weight of benzoyl peroxide at 80–85° C. for about 100 hours, removing by distillation the material volatile up to 100° C. at 0.5 mm. Hg, and extracting the residue with $CHCl_3$. The $CHCl_3$-insoluble polymer was entirely melted at 120° C. A 25 gram sample was mixed with $CoF_3$ and 140 gs. of a saturated fluorocarbon lubricating oil, B. P. 177–187° C. at 10 mm. Hg, as a solvent. The mixture was heated over a period of 24 hours, the temperature being raised gradually to 260° C. The cobaltic fluoride was added in portions at intervals during heating, 129 gs. being used in all. At the end of the reaction, the mixture of solid polymer and lubricating oil was washed first with cold, dilute $H_2SO_4$ and then with hot, concentrated $H_2SO_4$, and finally with water. The mixture was then treated with $CF_2ClCFCl_2$ (Freon 113) in order to dissolve and remove the lubricating oil and any soluble polymer. There remained a white polymer which melted from 190° C. to 200° C. and which was soft enough to be easily worked at 160° C. The polymer did not decolorize a solution of potassium permanganate in acetone which oxidizes unsaturated fluorocarbons, and was apparently saturated. A saturated oil polymer of the diene compound was recovered by vacuum distillation from the Freon solution.

EXAMPLE 28

2.4 grams perfluorobutadiene-1,3 and 0.2 g. benzoyl peroxide were heated together under pressure in a water bath at about 100° C. for 54 hours. Upon removal of volatile material and purification of the polymer, 0.5 g. of an oily solid was obtained.

EXAMPLE 29

Polymerization of 2.3 gs. hexafluorobutadiene-1,3 with 0.2 benzoyl peroxide for 54 hours with a 200 watt lamp illumination yielded after removal of volatile material, a small amount of product having a boiling point below 210° C. and 0.9 g. of residue boiling above 210° C.

EXAMPLE 30

Under a pressure of 16,000 kg./cm.$^2$ approximately 16 ccs. of hexafluorobutadiene-1,3 was polymerized for 18 hours at 63° C. The solid polymer was heated on an iron plate up to a temperature of about 275° C. at which point it could be easily spread by pressing manually with a spatula. The polymer was very rubbery at about 300° C. at which point there was no visible tendency to liquefy, although the sample retained only slight mechanical strength.

EXAMPLE 31

Fifteen ccs. of hexafluorobutadiene-1,3 was polymerized for 24 hours at a temperature of 65° C. in the presence of 0.1% benzoyl peroxide by weight based on the monomer. The applied pressure was approximately 15,000 kg./cm.² The solid product obtained was heated on an iron plate. At 300° C. the plastic was very resilient with only slight mechanical strength.

In the preferred method of molding, the solid polymer is placed in a positive mold maintained at about 275° C. A pressure is applied to the mold just sufficient to cause a slight extrusion of the polymer around the joint of the mold. The polymer temperature should be between 250 and 275° C. during the molding and the pressure should be applied throughout the molding cycle. The molded polymer is translucent, flexible and elastic.

The properties described hereinafter are those of the polymer which is produced at pressures of 10,000 to 20,000 kg./cm.² The elasticity of this polymer after molding is notable especially at elevated temperatures. For example, after the thickness of a molded disk ⅜″ thick and 1⅛″ in diameter was reduced about 40% under a load of 2,000 pounds, the plug returned almost immediately to substantially its original shape upon removal of the load. The molded polymer is translucent and sufficiently flexible to permit sharp bends substantially without permanent set.

The tensile strength of the molded polymer is in excess of 1,300 pounds per square inch and it may be stretched to an elongation of more than 200% with at least 50% recovery from the stretched length in 24 hours at room temperature. When under tension the polymer is elongated as soon as a relatively small load is applied and as the load is increased the material is continually elongated with the formation of a section of reduced cross-section characteristic of an orientable polymer until the sample breaks. During the elongation there is, moreover, a change in the rate at which added load causes elongation of the sample indicating that the polymer is orientable. The polymer is substantially not cross-linked.

At elevated temperatures the polymer is especially elastic. For example, under a pressure of about 33 pounds per square inch on a disk ⅝″ in diameter, cut from a sheet molded under pressure as described above, the disk of the polymer compressed from a thickness of 170 mils to 50 mils in 15 seconds at 225° C. At the end of 10 minutes the thickness was reduced to about 40 mils under the same conditions. However, on releasing the pressure, the sample immediately regained approximately its original shape. It was noted that on heating from room temperature to 225° C. the above-mentioned disk expanded considerably in thickness and the diameter was reduced. Such an expansion under heating is particularly valuable in gaskets. Thus, when a vessel is gasketed at room temperature and the vessel heated to an elevated temperature, the gasket seal is improved by the expansion of the gasket material.

At 125° C. the thickness of the central portion of a molded disk about ⅛″ in thickness was reduced about 93% with 84% recovery. In a repeated compression of the same sample the thickness was reduced 92% and recovered to within 97% of its value before compression.

The plastic hexafluorobutadiene polymer may be plasticized to yield valuable products. The polymer produced at pressures in excess of 10,000 kg./cm.² after plasticizing may be molded relatively easily in a positive-type mold or simply hot-pressed, provided the pressure is maintained throughout the molding operation. The preferred plasticizers are liquid alkyl compounds which are completely halogen substituted and contain a considerable amount of fluorine, for example, low molecular weight liquid hexafluorobutadiene polymer saturated with fluorine by treatment with a fluorinating agent, completely fluorine-substituted lubricating oil or low molecular weight liquid polymers of $C_2F_3Cl$. The last of these liquids is disclosed in my co-pending application, Serial Number 743,455, filed April 23, 1947. It is preferred to use between 10 and 50% plasticizer in the final product based on the weight of the polymer. Other useful plasticizers are halogenated ethers such as

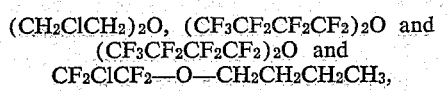

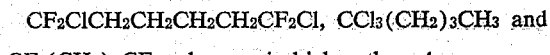

and partially halogenated hydrocarbons as $CF_2ClCH_2CH_2CH_2CH_2CF_2Cl$, $CCl_3(CH_2)_3CH_3$ and $CF_3(CH_2)_nCF_3$ where $n$ is higher than 4.

A sample of the high molecular weight solid hexafluorobutadiene polymer prepared at a pressure in excess of 10,000kgs./cm.² was plasticized by heating it for 20 minutes with a low molecular weight liquid hexafluorobutadiene-1,3 polymer which had been saturated with fluorine by treatment with cobalt trifluoride. The plasticizer was soluble in Freon 113, $C_2Cl_3F_3$. The plasticized polymer was soft and could be pressed hot to form a film. Another sample was treated with the same low molecular weight polymer in approximately a 1:1 weight ratio. The plasticized high molecular weight polymer was pressed at 170° C. to form a sheet and thereafter was washed with Freon 113 to remove the excess plasticizer. After washing, the solid polymer was press fitted cold to yield a translucent rubbery valve seat. With this material a vacuum-tight seal is easily obtained at the valve seat with a small applied force.

Still another sample of the same material was treated with fluorinated lubricating oil (boiling point 167 to 177° C. at 10 mms. Hg.) dissolved in Freon 113. The solid polymer absorbed approximately 45% by weight of the plasticizer after the Freon 113 had been evaporated while the temperature was raised to 200° C. At this temperature the plasticized polymer was worked manually with a brass rod until it became uniform in composition and appeared transparent and the solid was then transferred to a hot press where it was molded to yield a resilient piece under a pressure of less than 100 pounds per square inch at a temperature of around 200 to 210° C.

With respect to the chemical properties of the hexafluorobutadiene-1,3 high molecular weight polymer, it may be said that it is relatively inert as formed. The reason for this is, of course, the fact that it is substantially completely fluorine-substituted. Its inertness is somewhat reduced by the presence of double bonds. However, the unsaturation present is much less reactive than that of a hydrocarbon polymer. For example, exposure to air for long periods of the perfluorobutadiene high polymer without any added stabilizers against oxidation, has little effect on the fluorocarbon polymer under conditions which quickly destroy all elastic properties of an unsaturated hydrocarbon polymer unless effective stabilizers are added. The double bonds may be eliminated by saturating with a fluorinating agent such as elemental fluorine, antimony pentafluoride, $ClF_3$, chlorine, or with mixtures of chlorine and fluorine. After fluorine treatment the material resembles hard rubber becoming relatively less flexible and elastic while the softening point increases. However, the polymer changes relatively little in its mechanical properties after chlorine treatment and retains its resiliency.

The solid plastic high molecular weight hexafluorobutadiene-1,3 polymer is useful in many ways. Its elasticity and high recovery after distortion make it particularly valuble as a gasket material and for valve seats. Its corrosion resistance permits its use in a wide variety of situations where it may come in contact with extremely corrosive materials. This last is particularly true after the polymer has been fluorinated or chlorinated since after such treatment it is exceedingly stable. In general, it is useful also in many situations where rubber would be used because of its resiliency. The hexafluorobutadiene-1,3 polymer, particularly after fluorination or chlorination, may of course be used in those applications where rubber having similar physical properties would fail because of the corrosive conditions.

It is within the scope of my invention to produce polymers from other polyunsaturated fluoroolefins such as those disclosed in my co-pending application Serial Number 173,689 (48), filed July 13, 1950, e. g., $$CFCl=CCl-CCl=CF_2,$$

B. P. 104.5° C. at 740 mm. Hg.;

$$CFCl=CCl-CCl=CFCl,$$

B. P. 140.6° C.; CFCl=CFCF=CFCl, B. P. 82.7–83.2° C. at 740 mm. Hg.; CFCl=CCl—CF=CF_2, B. P. 72° C.; CF_2=CCl—CF=CF_2, B. P. 37° C.;

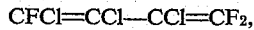

B. P. 39° C.; CF_2=C=CF_2, B. P. −28° C.; and corresponding bromine containing fluoroolefins in which bromine takes the place of chlorine. Copolymers of these monomers may also be prepared. The methods disclosed in this application are useful for preparing such polymers. Under the conditions described for thermal reaction in the foregoing, the following illustrations of copolymerization may be carried out:

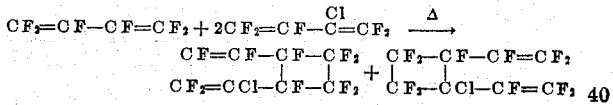

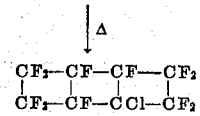

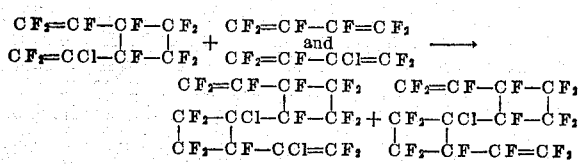

also

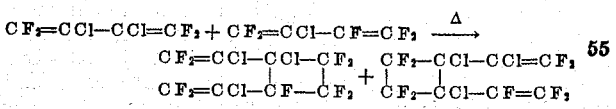

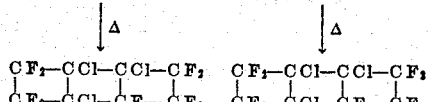

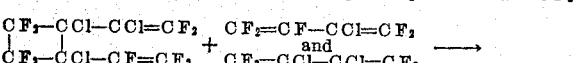

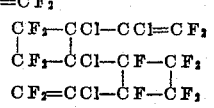

+

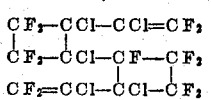

High molecular weight polymers may be made employing organic peroxides, from mixtures of monomers such as:

$$CF_2=CF-CF=CF_2 \text{ and } CF_2=CCl-CF=CF_2;$$

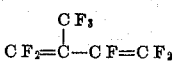

and $CF_2=CF-CF=CF_2$; or

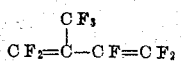

and $CF_2=CF-CCl=CF_2$.

The fluorocarbons and their derivatives of this invention are produced from olefins containing no hydrogen but some hydrogen may appear in the final product as the result of promoter fragments becoming attached to the product. The amount of hydrogen impurity in the product is less than 2% by weight and generally between 0% and 0.5%.

Since many embodiments might be made of the present invention and since many changes might be made in the embodiment described, it is to be understood that the foregoing description is to be interpreted as illustrative only and not in a limiting sense.

I claim:

1. A plastic composition comprising high molecular weight solid polymeric hexafluorobutadiene-1,3 and a low molecular weight liquid polymer of hexafluorobutadiene-1,3 as plasticizer.

2. Solid plastic polymeric hexafluorobutadiene-1,3.

3. Solid polymers of a polyunsaturated fluoroolefin which has at least three and not more than 12 base carbon atoms, at least two double bonds between base carbon atoms, and at least one fluorine atom attached to a base carbon atom, the remaining substituents being selected from at least one of the group consisting of the halogens and perhalogenated organic radicals not more than one of which contains more than three carbon atoms.

4. Solid polymers of a compound of the formula $$RRC=CR-CR=CRR$$

which has not more than 12 base carbon atoms per molecule and at least one of the R substituents is fluorine and the remaining R substituents are selected from the group consisting of the halogens and perhalogenated organic radicals not more than one of which contains more than three carbon atoms.

5. Solid polymers of a compound of the formula $$RRC=CR-CR=CRR$$

which compound has not more than 12 base carbon atoms per molecule and consists of carbon and halogen, in which at least one of the R substituents is fluorine and not more than one R substituent is an organic radical containing more than three carbon atoms.

6. Solid polymers of a conjugated butadiene completely substituted by halogens in which at least one of the substituents is fluorine.

7. Solid polymers of a compound of the formula $$RRC=CR-CR=CRR$$

which compound has not more than 12 base carbon atoms per molecule and consists of carbon and halogen, in which at least one of the R substituents is fluorine, at least one R substituent is a perhaloalkyl group of up to three carbon atoms and not more than one R substituent is an organic radical containing more than three carbon atoms.

8. Solid polymers of a compound of the formula $$RRC=CR-CR=CRR$$

which compound has not more than 12 base carbon atoms per molecule and consists of carbon and halogen selected from the group consisting of fluorine and chlorine, in which at least one of the R substituents is fluorine and not more than one R substituent is an organic radical containing more than three carbon atoms.

9. Solid polymers of a conjugated butadiene completely substituted by halogens selected from the group consisting of fluorine and chlorine in which at least one of the substituents is fluorine.

10. A solid polymer of hexafluorobutadiene-1,3.

11. A solid polymer of dichlorotetrafluorobutadiene-1,3.

12. Solid polymers of a compound of the formula

RRC=CR—CRR—CRR—CR=CRR which has not more than 12 base carbon atoms per molecule and at least one of the R substituents is fluorine and the remaining R substituents are selected from the group consisting of the halogens and perhalogenated organic radicals not more than one of which contains more than three carbon atoms.

13. Solid polymers of a compound of the formula

RRC=CR—CRR—CRR—CR=CRR which compound has not more than 12 base carbon atoms per molecule and consists of carbon and halogen, in which at least one of the R substituents is fluorine and not more than one R substituent is an organic radical containing more than three carbon atoms.

14. Solid polymers of a hexadiene-1,5 completely substituted by halogen in which at least one of the substituents is fluorine.

15. Solid polymers of a hexadiene-1,5 completely substituted by halogens selected from the group consisting of fluorine and chlorine in which at least one of the substituents is fluorine.

16. A solid polymer of perfluorohexadiene-1,5.

17. The method of producing solid polymers which comprises introducing into a reaction zone and maintaining at a temperature in the range of 90° C. to 700° C., a polyunsaturated fluoroolefin having at least three and not more than 12 base carbon atoms, at least two double bonds between base carbon atoms, and at least one fluorine atom attached to a base carbon atom, the remaining substituents bein gselected from the group consisting of the halogens and perhalogenated organic radicals not more than one of which contains more than three carbon atoms, and collecting a solid polymeric material.

18. The method of producing solid polymers which comprises introducing into a reaction zone a compound of the formula

RRC=CR—CR=CRR which has not more than 12 base carbon atoms per molecule and at least one of the R substituents is fluorine and the remaining R substituents are selected from the group consisting of the halogens and perhalogenated organic radicals not more than one of which contains more than three carbon atoms, maintaining said compound at a temperature in the range of 90° C. to 700° C., and collecting solid polymeric material.

19. The method of producing solid polymers which comprises introducing into a reaction zone a compound of the formula

RRC=CR—CR=CRR which compound has not more than 12 base carbon atoms per molecule and consists of carbon and halogen, in which at least one of the R substituents is fluorine and not more than one R substituent is an organic radical containing more than three carbon atoms, maintaining said compound at a temperature in the range of 90° C. to 700° C., and collecting at least one solid polymeric material.

20. The method of producing solid polymers which comprises introducing into a reaction zone a compound of the formula

RRC=CR—CR=CRR which compound has not more than 12 base carbon atoms per molecule and consists of carbon and halogen selected from the group consisting of chlorine and fluorine, in which at least one of the R substituents is fluorine, and not more than one R substituent is an organic radical containing more than three carbon atoms, maintaining said compound at a temperature in the range of 90° C. to 700° C., and collecting at least one solid polymeric material.

21. The method of producing solid polymers which comprises introducing into a reaction zone hexafluorobutadiene-1,3, maintaining said compound at a temperature in the range of 90° C. to 700° C., and collecting a solid polymer of hexafluorobutadiene-1,3.

22. The method of producing solid polymers which comprises introducing into a reaction zone a compound of the formula

RRC=CR—CRR—CRR—CR=CRR which has not more than 12 base carbon atoms per molecule and at least one of the R substituents is fluorine and the remaining R substituents are selected from the group consisting of the halogens and perhalogenated organic radicals not more than one of which contains more than three carbon atoms, maintaining said compound at a temperature in the range of 90° C. to 700° C., and collecting solid polymeric material.

23. The method of producing solid polymers which comprises introducing into a reaction zone and maintaining at a temperature in the range of 90° C. to 700° C., a polyunsaturated fluoroolefin having at least three and not more than 12 base carbon atoms, at least two double bonds between base carbon atoms, and at least one fluorine atom attached to a base carbon atom, the remaining substituents being halogens, and collecting a solid polymer of said polyunsaturated fluoroolefin.

24. The method of producing solid polymers which comprises introducing into a reaction zone perfluorohexadiene-1,5, maintaining said compound at a temperature in the range of 90° C. to 700° C. and collecting at least one solid polymeric material.

References Cited in the file of this patent

UNITED STATES PATENTS

| | | |
|---|---|---|
| 2,230,654 | Plunkett | Feb. 4, 1941 |
| 2,406,153 | Lewis | Aug. 20, 1946 |
| 2,567,956 | Miller | Sept. 18, 1951 |
| 2,600,802 | Passino | June 17, 1952 |
| 2,668,182 | Miller | Feb. 2, 1954 |